July 23, 1946.  Y. H. KURKJIAN  2,404,384
SELF-SUPPORTING PESSARY
Filed Feb. 5, 1943  2 Sheets-Sheet 1
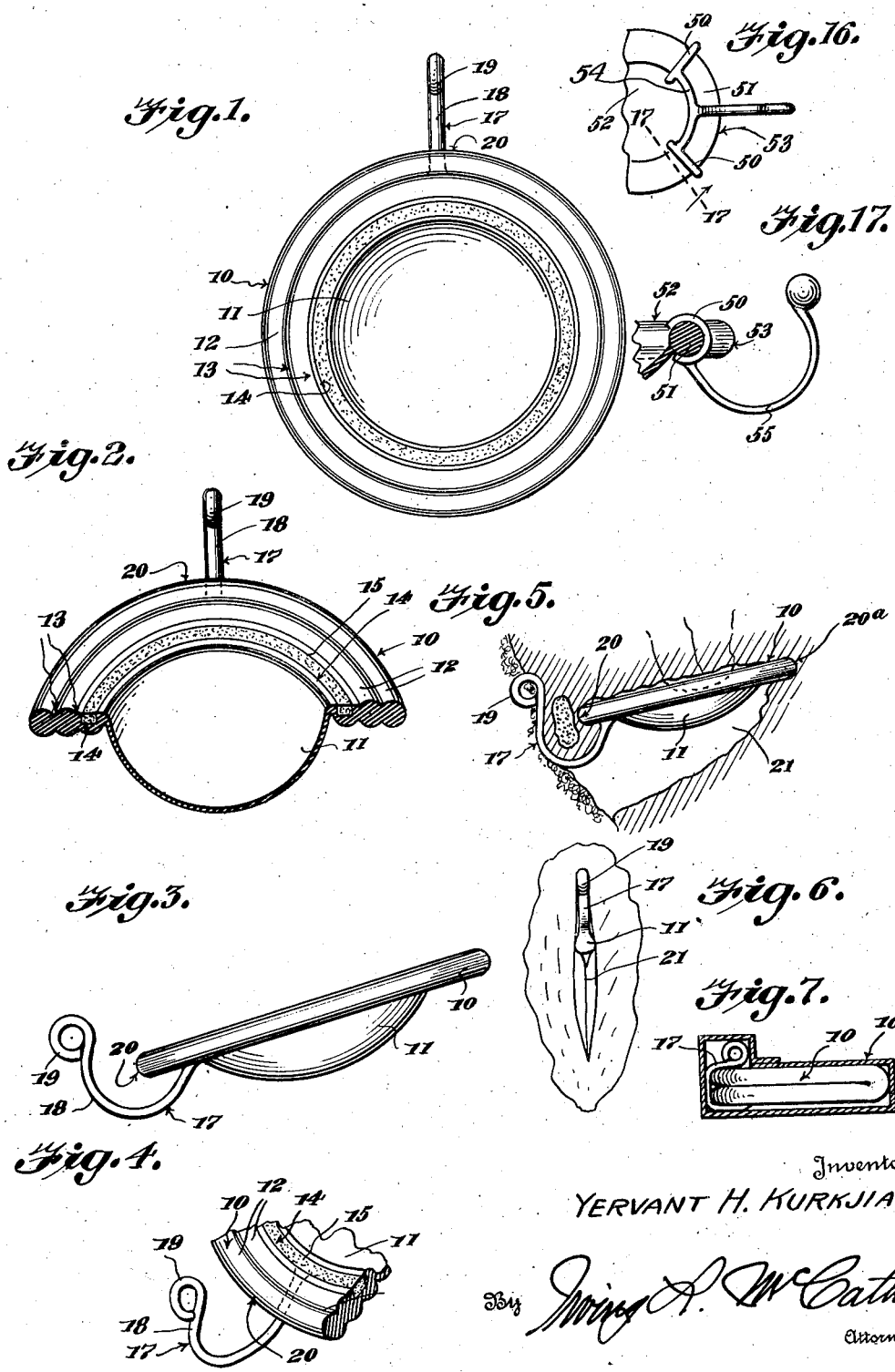
Inventor
YERVANT H. KURKJIAN July 23, 1946.　　　Y. H. KURKJIAN　　　2,404,384
SELF-SUPPORTING PESSARY
Filed Feb. 5, 1943　　　2 Sheets-Sheet 2
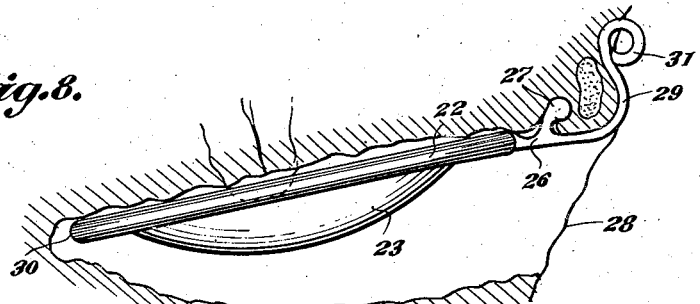
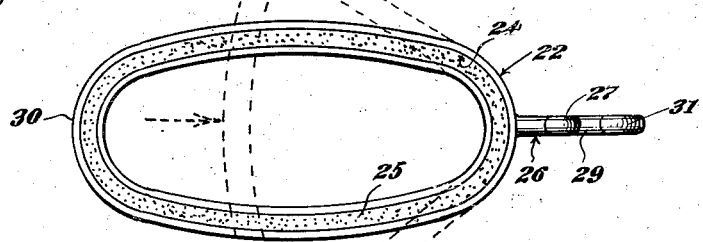
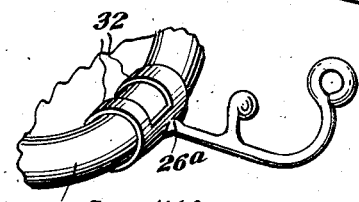
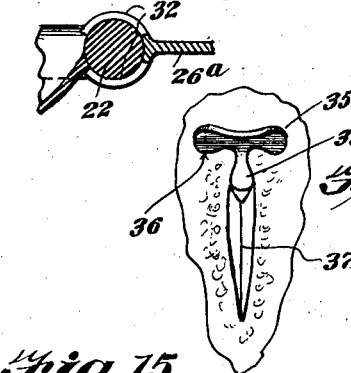
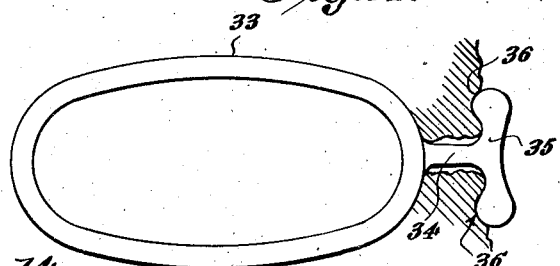
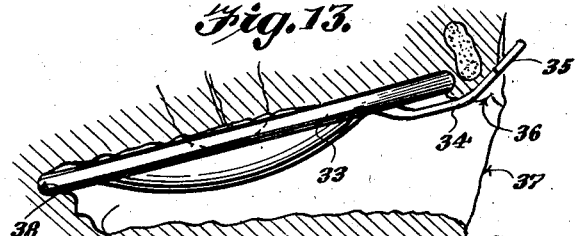
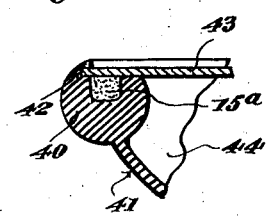
Inventor
YERVANT H. KURKJIAN
By [signature]
Attorney Patented July 23, 1946

2,404,384

UNITED STATES PATENT OFFICE 2,404,384

SELF-SUPPORTING PESSARY

Yervant H. Kurkjian, Clifton, N. J.

Application February 5, 1943, Serial No. 474,868

2 Claims. (Cl. 128—128)

This invention relates to a pessary and has for one of its objects the production of a simple and efficient pessary which is provided with means for gripping the body of the wearer at the mouth of the vagina opening for supporting the pessary in position within the vagina opening.

A further object of this invention is the production of a simple and efficient pessary having an exterior supporting means for supporting the pessary from an outside position relative to the vagina opening, the supporting means also constituting a handle for facilitating the insertion, as well as the removal, of the pessary, to and from an inserted position.

Another object of this invention is the production of a pessary having a plurality of detachable portions which portions may be removed to render the pessary adjustable as to size.

In the drawings:

Figure 1 is a top plan view of the pessary;

Figure 2 is a transverse sectional perspective view;

Figure 3 is a side elevational view;

Figure 4 is a fragmentary perspective view illustrating the supporting means;

Figure 5 is a sectional view showing certain internal parts of the human body with the pessary in position;

Figure 6 is an exterior view showing the pessary in position and the supporting means which holds the pessary in position;

Figure 7 is a side elevational view of the pessary folded and mounted within a container;

Figure 8 is a side elevational view of a modified form of pessary mounted in position;

Figure 9 is a top plan view of the form of pessary shown in Figure 8;

Figure 10 is a fragmentary perspective view of a pessary showing a detachable supporting means carried thereby;

Figure 11 is a transverse sectional view through the rim of the pessary and detachable supporting means of the type shown in Figure 10;

Figure 12 is a top plan view of a modified form of pessary, certain portions of the human body being shown in section;

Figure 13 is a side elevational view of the form shown in Figure 12, the pessary being shown in a supported position;

Figure 14 is a front elevational view of the pessary in an inserted position;

Figure 15 is a transverse sectional view through the rim of the pessary illustrating a sealing disc in position to retain medicated jelly and the like carried by the pessary;

Figure 16 is a fragmentary bottom plan view of one end of a pessary, showing a modified form of a detachable handle and supporting means for the pessary;

Figure 17 is a transverse sectional view taken on line 17—17 of Figure 16.

By referring to the drawings it will be seen that 10 designates the pessary which comprises a central sack portion or cup-like portion 11. This cup-like portion 11 carries an annular laterally extending flange comprising a plurality of concentric ribs 12. These ribs 12 may be defined by marking or by indenting the junction of the ribs, as indicated at 13 in Figure 2, to facilitate the cutting of one or more ribs from the body of the pessary to reduce the diameter thereof. A channel 14 is preferably formed in the outer face of the flange of the body 10 adjacent the cup-like portion 11 and inwardly of the inner rib 12, as shown in Figure 2. A suitable medicated jelly-like substance 15 is placed in the channel 14 for treating certain vital internal parts within the vaginal canal. Since the pessary is formed of flexible rubber, the pessary may be folded to facilitate placing the pessary in position or for packing in a container 16 of suitable construction, such as is shown in Figure 7. A suitable medical substance may be carried in the cup-like portion 11, if desired.

The pessary 10 carries a supporting clamp 17 which also constitutes a removing means near the front end thereof. This clamp 17 is preferably integrally connected to the lower or under face of the rim of the pessary inwardly of the periphery of the pessary, as shown in Figures 3 and 5, to provide a protruding or overhanging edge 20 above the supporting clamp 17. This supporting clamp 17 is formed of rubber of sufficient body and strength to clamp around the front upper end of the entrance of the vagina adjacent and around the pubic bone, as shown in Figure 5. This clamp extends upwardly and contracts to compress the flesh and hold the pessary within the vaginal canal by means of an inner and outer clamping action. The edge 20 of the pessary in the form shown in Figures 1 to 6 constitutes the inner portion of the clamp and the narrow tongue 18 constitutes the outer portion of the clamp. A knob or enlarged portion 19 is carried by the outer end of the tongue 18 to provide a finger-grip to facilitate the removal of the pessary 10 from the vaginal canal 21. In the form shown in Figure 5, it should be noted that the tongue 18, the edge 20, and the inner edge 20ª, provide a three-point suspension for the pessary when in position to firmly hold the pessary against accidental removal or displacement.

In Figures 8 and 9, I have shown a modified type of pessary of an elongated elliptical form comprising a bead or rim 22, and a sack or cup-like portion 23. The bead or rim 22 is provided with a channel 24 in its upper face for receiving a suitable medicated jelly-like substance 25 similar to the form shown in Figure 1. The pessary in this form may be flexed to the position shown in dotted lines, if desired, to fit the pessary in position. A clamping handle 26 projects from the forward edge of the rim 22, as shown. This clamping handle 26 comprises an inner clamping jaw 27 which is adapted to engage the flesh just inside the opening 28 behind the pubic bone while the opposing jaw 29 of the clamping handle 26 impresses itself into the flesh just above and upon the outside of the opening 28 in front of the pubic bone. This form of clamping handle 26 constitutes a two-point suspension for the pessary located at the front of the opening and will efficiently support the pessary in position whether or not the inner edge 30, as in Figure 8, is in a contacting or supporting position such as is shown in Figure 5. The outer end of the handle 26 is provided with a knob 31 to facilitate handling.

As shown in Figure 10, a detachable clamping handle 26ª may be provided for detachable connection with the rim 22ª of the pessary by means of the clamping jaws 32.

As shown in Figures 12 to 14 inclusive, which illustrate a modified form, the pessary 33 carries a projecting tongue 34 having a T-shaped head 35 at its outer end. This head 35 is provided with rearwardly extending rounded lips 36 at its inner edge upon opposite sides of the tongue 34 which are adapted to be impressed into the flesh above and in front of the opening 37 to hold the pessary in place. In this form the inner edge 38 of the pessary 33 is adapted to be impressed into the flesh at the inner end of the channel 39 to provide a second point of suspension for the pessary.

As shown in Figure 15, the rim or bead 40 of the pessary 41 may be provided with a channel 42 in which is snapped a stiff closure plate 43 to enclose the medicated jelly 15ª carried by the rim or bead 40, and also to enclose a medical substance which may be carried in the cup-like portion 44. This type of closure plate 43 may be applied to any of the illustrated forms without departing from the spirit of the invention merely by providing a suitable receiving channel 42.

As shown in Figures 16 and 17, a modified form of a detachable supporting means and handle is illustrated. Two spaced clamping rim-engaging clips 50 engage the rim 51 of the pessary 52, the rim being adapted to protrude between the clips 50, as shown in Figures 16 and 17, to provide a supporting flesh-engaging portion 53. The clips 50 are connected by a connecting bridge 54 as shown in Figure 16, located near the rear of the clips 50 and a protruding forwardly extending clamping tongue 55 projects forwardly and upwardly of the clips 50 and the pessary 52. The forward edge or portion 53 will constitute one jaw of a supporting clamp while the clamping tongue 55 constitutes the opposing jaw of the clamp.

It should be understood that the pessary illustrated in all of the modified forms may be used for holding a menstruation pad by placing the pad in the cup-like portion of the pessary, if desired, without departing from the spirit of the invention. If desired, the structure illustrated may be utilized for supporting any suitable means for internal treatment of vital parts of the body within the vaginal canal, by placing the means for treatment in the cup-like portion of the pessary.

The clamping portions of the various forms illustrated may be formed of any suitable materials such as rubber, vulcanized rubber, plastics, or stainless steel, or such other material as might be found most convenient and suitable.

These clamping portions constitute a substantially U-shaped clamp or supporting and gripping means for snugly engaging the body of the wearer, the jaws of the clamp fitting directly in front and in the rear of the pubic bone—see Figure 5, thereby providing a substantially U-shaped pocket between the jaws for receiving the pubic bone and providing an efficient support for the pessary.

Having described the invention, what I claim is:

1. A pessary of the class described comprising a flexible body adapted to be inserted into the vaginal canal and adapted to engage the inner end of the canal at one point and also adapted to engage the upper wall of the canal at an opposite point just inside the entrance of the canal, and a supporting and removing means carried by the flexible body and adapted to protrude through the entrance of the canal and engage the body of the user exteriorly of the opening of the vaginal canal, the engaging points of the flexible body and the supporting means providing a three-point suspension for the pessary to hold the pessary against accidental displacement.

2. A pessary of the class described comprising a flexible body adapted to be inserted into the vaginal canal and adapted to engage the inner end of the canal at one point and also adapted to engage the upper wall of the canal at an opposite point just inside the entrance of the canal, and a supporting and removing means carried by the flexible body and adapted to protrude through the entrance of the canal and engage the body of the user exteriorly of the opening of the vaginal canal, the engaging points of the flexible body and the supporting means providing a three-point suspension for the pessary to hold the pessary against accidental displacement, said supporting and removing means engaging the under face of the flexible body at a point inset relative to the outer edge of the flexible body in a manner whereby the edge of the flexible body overhangs a portion of the supporting and removing means.

YERVANT H. KURKJIAN.